(12) United States Patent
Malavasi et al.

(10) Patent No.: US 9,557,052 B2
(45) Date of Patent: Jan. 31, 2017

(54) METHOD AND PLANT FOR THE TREATMENT OF MATERIALS, IN PARTICULAR WASTE MATERIALS AND REFUSE

(71) Applicant: ITEA S.P.A., Bologna (IT)

(72) Inventors: Massimo Malavasi, Milan (IT); Edoardo Rossetti, Bologna (IT)

(73) Assignee: ITEA S.p.A., Bologna (IT)

( * ) Notice: Subject to any disclaimer, the term of this patent is extended or adjusted under 35 U.S.C. 154(b) by 501 days.

(21) Appl. No.: 14/080,490

(22) Filed: Nov. 14, 2013

(65) Prior Publication Data

US 2014/0076214 A1 Mar. 20, 2014

Related U.S. Application Data

(63) Continuation of application No. 10/553,784, filed as application No. PCT/IB2004/001220 on Apr. 22, 2004, now abandoned.

(30) Foreign Application Priority Data

Apr. 23, 2003 (IT) .............................. BO2003A0242

(51) Int. Cl.
*F23C 9/00* (2006.01)
*F23L 7/00* (2006.01)
(Continued)

(52) U.S. Cl.
CPC ................. *F23C 9/00* (2013.01); *F23G 5/006* (2013.01); *F23G 5/008* (2013.01); *F23G 5/50* (2013.01);
(Continued)

(58) Field of Classification Search
CPC ............ F23G 5/50; F23G 5/008; F23G 5/006; F23G 2202/106; F23G 2206/203; F23G 2202/30; F23G 2202/20; F23C 9/00; F23C 2900/99001; F23L 7/002; F23L 7/007; F23L 7/00; F23L 2900/07; F23J 1/00; Y02E 20/342; Y02E 20/12; Y02E 20/344

(Continued)

(56) References Cited

U.S. PATENT DOCUMENTS 1,703,814 A * 2/1929 Coutant .................. F23C 99/00
110/165 R
4,022,591 A * 5/1977 Staudinger ............... C10J 3/485
110/263

(Continued)

FOREIGN PATENT DOCUMENTS

EP 0416533 A 3/1991

OTHER PUBLICATIONS

International Search Report, PCT/IB2004/001220 dated Sep. 17, 2004.

*Primary Examiner* — David J Laux
(74) *Attorney, Agent, or Firm* — Arent Fox LLP

(57) ABSTRACT

A plant for the treatment of materials, in particular waste materials and refuse, comprises a combustion reactor to which the material to be treated can be supplied. The combustion reactor has an input for a combustion supporter comprising oxygen and an output for the gases that are produced during the combustion of the materials inside the reactor and, in use, is substantially isothermic or quasi-isothermic at high or very high temperature, and without substantial oxygen deficit, in all of its parts. A portion of the combustion gases is recirculated and mixed with the combustion supporter to bring about a high degree of opacification thereof, which is increased by increasing the total pressure of the combustion chamber. The substances which cannot be gasified inside the reactor are immediately fused.

(Continued)

The parameters of the gases at the output from the reactor are constantly measured by sensors with response-time characteristics of about 2 seconds.

26 Claims, 1 Drawing Sheet

(51) Int. Cl.
  *F23G 5/00* (2006.01)
  *F23G 5/50* (2006.01)
  *F23J 1/08* (2006.01)

(52) U.S. Cl.
  CPC ............... *F23L 7/00* (2013.01); *F23L 7/002* (2013.01); *F23L 7/007* (2013.01); *F23C 2900/99001* (2013.01); *F23G 2202/106* (2013.01); *F23G 2202/20* (2013.01); *F23G 2202/30* (2013.01); *F23G 2206/203* (2013.01); *F23G 2900/50006* (2013.01); *F23J 1/08* (2013.01); *F23L 2900/07005* (2013.01); *F23L 2900/07008* (2013.01); *Y02E 20/12* (2013.01); *Y02E 20/342* (2013.01); *Y02E 20/344* (2013.01)

(58) Field of Classification Search
  USPC ....... 110/235, 236, 306, 346, 348, 203, 204, 110/342, 344, 345, 185, 189; 48/197 R
  See application file for complete search history.

(56) References Cited

U.S. PATENT DOCUMENTS

| | | | |
|---|---|---|---|
| 4,850,288 A | 7/1989 | Hoffert et al. | |
| 4,925,389 A | 5/1990 | DeCicco et al. | |
| 4,993,332 A * | 2/1991 | Boross | F23C 1/00 110/204 |
| 5,000,098 A | 3/1991 | Ikeda et al. | |
| 5,052,312 A | 10/1991 | Rackley et al. | |
| 5,199,356 A | 4/1993 | Hoffert | |
| 5,309,850 A | 5/1994 | Downs et al. | |
| 5,320,050 A | 6/1994 | Ishida et al. | |
| 5,326,254 A * | 7/1994 | Munk | F23C 9/08 110/204 |
| 5,353,720 A | 10/1994 | Berg | |
| 5,385,104 A | 1/1995 | Binner | |
| 5,636,977 A | 6/1997 | Cole et al. | |
| 6,024,029 A * | 2/2000 | Clark | F23C 6/042 110/203 |
| 6,029,588 A | 2/2000 | Baudhuin | |
| 6,145,452 A * | 11/2000 | Heger | F23M 5/04 110/336 |
| 6,485,296 B1 | 11/2002 | Bender et al. | |
| 6,848,375 B2 * | 2/2005 | Kasin | F23C 9/00 110/185 |
| 6,883,443 B2 | 4/2005 | Rettig et al. | |

* cited by examiner

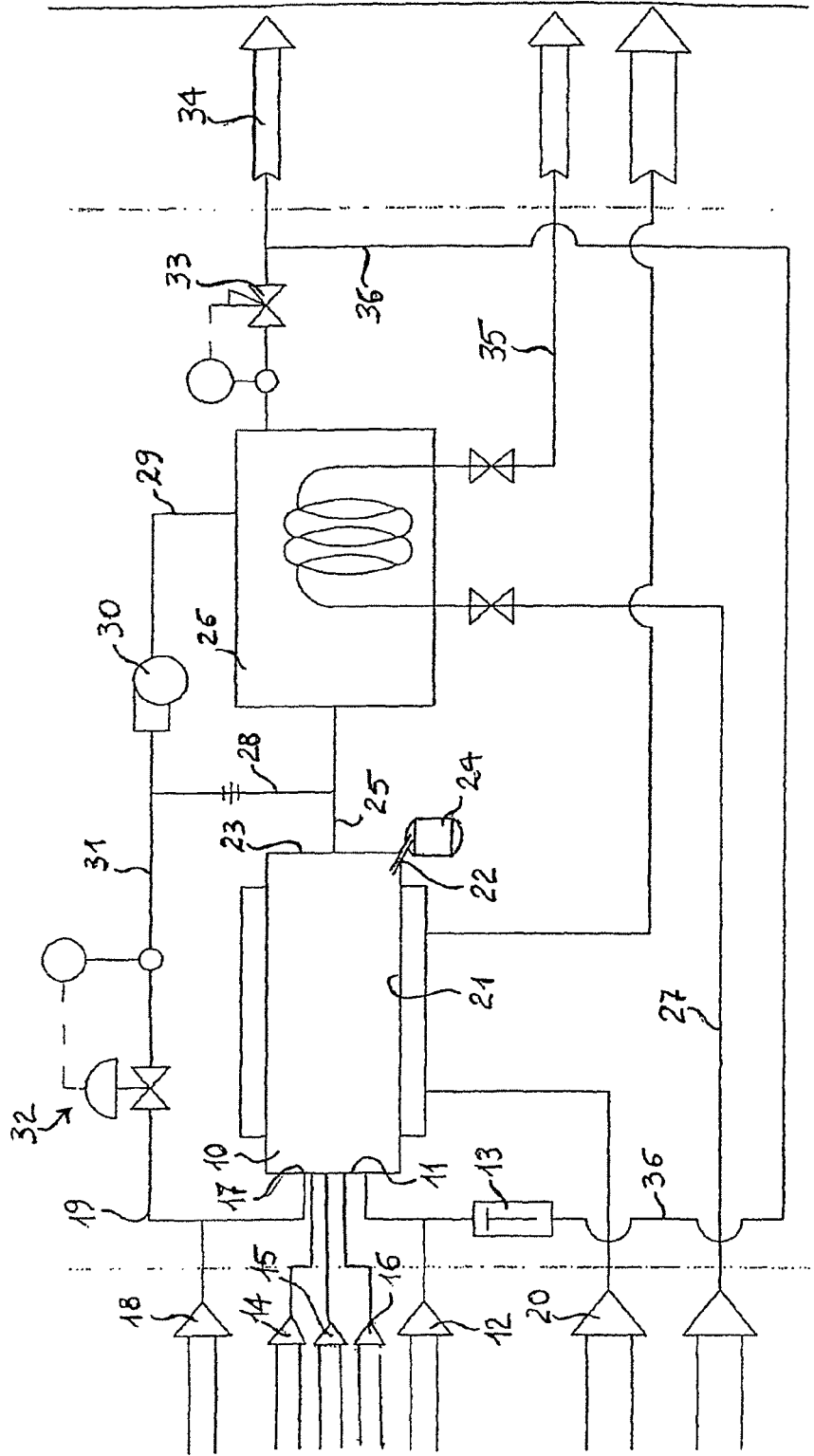

METHOD AND PLANT FOR THE TREATMENT OF MATERIALS, IN PARTICULAR WASTE MATERIALS AND REFUSE

CROSS REFERENCE TO RELATED APPLICATION

This is a Continuation Application of U.S. patent application Ser. No. 10/553,784, filed Aug. 4, 2006; which in turn is a National Stage Entry of International Application No. PCT/IB20041001220, filed Apr. 22, 2004; which claims priority to Italian Patent Application No. BO2003A000242, filed Apr. 23, 2003. The disclosures of each of the prior applications are hereby incorporated in their entirety by reference.

The present invention relates to a method and to a plant for the treatment of materials of various types and, in particular but in non-limiting manner, waste materials and refuse.

The invention has been developed with particular reference to a plant which can receive as inputs any materials in solid, granular or liquid form or as sludges, and to a method which brings about the treatment thereof with the production of inert slag and gases which can easily be disposed of without damage to the environment.

BACKGROUND

A known method and plant of the type indicated above are described in U.S. Pat. No. 5,337,683 and subsequent improvements in the same applicant's patent application WO 02/081970. This patent relates to a method which enables materials, for example, waste materials and refuse, to be treated in order to ensure easy and economic disposal thereof by the introduction of the materials into a pressurized reactor into which air enriched with oxygen, possibly up to 100% (that is, pure oxygen, at least within the limits achievable with the technical means available) is injected. The high temperature reached in the reactor causes complete dissociation of the molecular bonds of the material to be treated and its sublimation.

As described in the above-mentioned U.S. Pat. No. 5,337,683, the method is preferably implemented by maintaining a pressure of between 30 and 100 bar inside the reactor, although the use of lower pressures, even only slightly above atmospheric pressure, is not excluded, in order in any case to bring about complete molecular dissociation of the materials and their sublimation inside the reactor, once the most suitable application times and temperatures for the type of material to be treated have been established.

Another known method is described in the same applicant's WO 02/081970 which improves the method described above, enabling the pressure inside the reactor to be regulated by modulating it between a minimum value and a maximum value in accordance with predetermined rules of variation, thus increasing the yield and reducing the time required for the complete dissociation of the molecular bonds of the material inside the reactor, without thereby requiring excessively high temperatures and pressures which would result in an increase in the design and constructional complexity of the reactor.

However, the transients that are implicit in the method do not ensure, at every moment during the course of the reaction and for any type of combustible material, the absence of relatively cold zones of the reactor where the volatile organic substances generated by the heating of the combustible material can recombine to form substances that are kinetically slow to oxidise, more stable thermally and, unfortunately, more toxic, such as dioxins, furans and polyaromatics.

The infinite variety of compositions of the incombustible ashes of the refuse also include compositions of metal oxides which do not sublime and therefore accumulate in the reactor. The above-mentioned plants and methods, implemented at both pilot and industrial level, have provided satisfactory results. However, it has emerged from accrued experience, that it is necessary and appropriate to implement improvements which ensure, as far as possible, that the volatile organic substances produced are not in conditions such that they recombine to form substances which are kinetically slow to oxidise, more stable thermally and, unfortunately, more toxic such as dioxins and furans.

The object of the present invention is therefore to provide a method and plant which satisfy the above-mentioned requirements in most cases and which at the same time are effective, easy to implement, and very reliable in use.

U.S. Pat. No. 6,029,588 describes the combustion of combustible materials, including toxic refuse, in a rotary cylindrical reactor which is supplied with the combustible material, with the combustion supporter, and with preheated recycled combustion gases, the incombustible ashes being discharged at the base of the rotary drum.

However, the combustion-temperature ceiling, which is represented by the fusion temperature of the ashes, and the presence of inevitable cold zones on the supply side (which are typical in the art) lead to the production of toxic organic by-products (dioxins and furans, etc.) which are transported by the fumes. An increase in dust (volatile ashes) which is entrained by the fumes and which contains heavy metals that are well known to be toxic, is also observed and is particularly marked as the temperature of the reactor increases. As a result, there is therefore a substantially increased load on the techniques for the after-treatment of the fumes and the problem of the organic and inorganic toxic substances is shifted from the combustion gases to liquid and solid phases, the disposal of which is problematical (and which give rise to so-called permanent leaching).

U.S. Pat. No. 5,309,850 provides for the treatment of sludges with high solids and water content in a reactor which brings about combustion of the organic substances and fusion of the incombustible ashes with subsequent solidification as inert vitreous slag. The reactor is supplied with sludges, combustion supporter and combustion fumes which are recycled to the reactor after the removal of water vapour by condensation and reheating. The fumes have the dual purpose of a thermal moderator and a vehicle for the removal of the large quantities of water that are introduced with the sludge.

However, although the recycled fumes from which the water has been removed are preheated, they do not eliminate the cold zones on the supply side of the reactor, with the consequences that are known in the art with regard to the formation of toxic organic substances, and the temperatures reached during combustion permit only partial segregation of the incombustible ashes and in particular of the melting fraction, since the volatile component of the ashes is entrained in the combustion fumes.

In order to achieve the object indicated above, the subject of the present invention is a method and a plant having the characteristics indicated in claims 1 and 15, respectively, which are appended to the present description.

In particular, experiments carried out by the Applicant have made available data which has led to the identification of the fundamental characteristics of a combustion reactor, or more generally, an oxidation chamber, in a plant according to the present invention. In greater detail, the plant comprises a combustion reactor which is substantially isothermic or quasi-isothermic in use at high or very temperature, including the walls, and without substantial oxygen deficit, in all of its parts.

In a particular embodiment of the present invention, the means for bringing about the high exchanges and transfers of heat between the walls of the reactor and the supplied and combustion gases, and between those gases and the combustible material (mainly with the solid combustible material), is represented by IR (infra-red) radiation which leads to exchange flows and heat transfer which are greater the higher is the temperature (proportional to $T^4$).

Surprisingly, it has been found that combustion with oxygen produces mixtures of gases with a high concentration (greater than approximately 90% by volume) of compounds which are strong absorbers-emitters of IR radiation, such as $CO_2$ and $H_2O$ (particularly the latter), that is, which are "opaque" gases and, furthermore, that this intrinsic characteristic can be further strengthened by increasing the volume density of those gases, that is, the total pressure of the combustion chamber.

Similarly, it has also surprisingly been found that, during combustion with technical oxygen, the mixing of the cool oxygen with combustion fumes (in a concentration greater than 10% by volume and preferably greater than 60% by volume) produces a mixture which ensures a high degree of "opacification" of the combustion supporter, and even more so when operating under pressure and, therefore, in an irradiated reactor, ensures almost instantaneous heating of the combustion supporter supplied, to temperatures above 1300° K.

The large cold zones in the vicinity of the supply which are typical of combustion supporters of the prior art with oxygen and/or air combustion supporter (in view of the fact that both oxygen $O_2$ and nitrogen $N_2$ are gases that are transparent to IR) can thus be eliminated in the above-mentioned particular embodiment of the invention.

An advantage of the method indicated above is also clear in the determination of the stream of recycled gases. It is in fact known in the art that the recycled gases can perform the function of ensuring the thermal balance of a continuously operated plant by removing the excess reaction heat, owing to an appreciable heat difference between the input and the output of the reactor. The minimum recycling flow-rate of gases to be selected in order to minimize the impact on the reaction volume is accompanied by low temperatures of the recycled gases (just above the dew point of the burnt gases, that is about 500°K, to avoid the use of materials which are bound to a high degree in contact with acid condensates). The above-described instantaneous heating of the recycling stream enables the recycling temperature to be reduced to the minimum. Preferably, the recirculation gases resulting from combustion are supplied at minimized flow-rate and/or temperature so as to minimize the overall volume of gas in the reactor for a given time spent in the reactor by the gases and to ensure the removal of the reaction heat from the reactor.

In the present invention, therefore, in contrast with the teachings of U.S. Pat. Nos. 5,309,850 and 6,029,588 which provide for the withdrawal of the recycling stream from the fumes after separation of the water by condensation and preheating prior to recycling to the reactor, the presence of the water in the recycling stream is instead encouraged in order to strengthen the radiating flows away from and towards the gas in every part of the reaction chamber to the extent of possibly providing for the injection of water into the recycling stream, for example, for predominantly carbon materials and materials with low moisture content, in order to bring the concentration of water in the recirculation stream at least to more than 10% by volume, preferably more than 20% by volume and even more preferably more than 30% by volume. The introduction of the water into the recirculation stream may go as far as total replacement of the fumes as recycling agent. However, it is not advisable to go so far as to cover the descending portion, from the optimum, which arises owing to the predominance of the negative effects of the reduction of the useful reaction volume due to the unfavourable differential of the molar specific heat of water in comparison with carbon dioxide.

In a further preferred embodiment of the invention, a substantially continuous method is therefore configured and is implemented in a compact reactor of limited dimensions, preferably but in non-limiting manner with a ceramic lining, by means of the use of technical oxygen and of pressure, at high or very high temperatures (preferably above 1900°K), and therefore with high energy exchanges between the walls, between the gases and the walls, and vice versa, with rapid heating of the combustible material and of the combustion supporter by radiation, substantially very close to the isothermic profile which constitutes one of the principal characteristics of the present invention.

Another advantageous characteristic of the invention results from the fact that it has surprisingly been found that the reaction pressure can be modulated (from atmospheric pressure preferably up to about 600 kPa) in dependence on the type of refuse, to ensure, for every part of the reactor, a large quantity of oxygen per unit reactor volume in a limited volume (known in the field as a hold-up) in spite of the reduction in density of the gas due to the high temperatures. Differences in the combustion phases (flash, tar, char) in fact arise with variations in the type of material to be treated and, in particular, as a result of variability in the characteristics even of the same waste material or refuse; these differences give rise to situations of sudden and local oxygen-consumption peaks which are not detectable and in any case cannot be corrected by normal conventional sensor and control systems. The hold-up of oxygen offers a passive protection against the formation of oxygen deficit zones within the reactor by virtue of the high partial pressure of oxygen that is applicable for a given concentration at the output of the reactor, that is, without the waste of oxygen which would result if large excesses thereof, relative to the stoichiometric quantity that is necessary for theoretical correct combustion, were to be used.

Another advantageous characteristic of the invention results from the further surprising observation of the efficacy with which the reactor of the present invention can operate on incombustible slag. It has been observed that the high rate of heating of the combustible material (solid or of the solid fraction) by radiation, in contrast with the prior art (e.g. U.S. Pat. No. 5,309,850), leads to a considerable reduction in the fraction of dust that is entrained out of the reactor with the burnt gases, and a parallel increase in the fused liquid ash segregated in the reactor. It is assumed, but this interpretation is not limiting, that the compact reactor with low gas transit speeds and high heating rate renders fusion competitive with the removal of the dusty ashes by the gases. Moreover, the low formation of volatile ashes, even with the supply of combustible materials with a high dusty-fraction content, leads to the assumption, although this interpretation should not be considered limiting, that the high degree of radiation of the method also leads to the liquefaction of volatile ashes of whatever provenance in the gas, and that coalescence phenomena operate on the liquid particles; it is well known that these phenomena are not active on solid particles of volatile ashes owing to the electrical charges.

To facilitate the extraction of the fused slag from the reactor, it is preferable but not essential to add scorifiers such as silica and/or alkali-metal oxides to the combustible material supplied, at percentages which depend on the ash content of the combustible material supplied.

The fused slag is preferably cooled and solidified as beads so as to ensure that the toxic heavy metals contained in the incombustible slag are rendered completely inert so that the release of heavy metals is below the legal limits in accordance with the solubilization in acetic acid test.

As a whole, the method of the present invention can ensure, over a wide range of types of materials in the physical form of solids, granular solids, liquids and sludges, the production, at the mouth of the reactor, of combustion fumes with a very low TOC (of the order of parts per million—ppm) and with a very low volatile ash content. This substantially simplifies the techniques for the after-treatment of the combustion fumes and renders the disposal of the liquid/solid phases used in the after-treatment much less problematical environmentally.

With reference to a further advantageous characteristic of the present invention, it has been observed that, in general, the performance of a method also depends on an effective control and management system. In particular, it has been observed that it is a distinctive feature of waste materials and refuse to elude effective characterization which can represent precisely the characteristics of the material that is supplied to the reactor. Efforts in this direction, in particular extensive characterizations assisted by statistical sampling and evaluation methods cannot overcome this distinctive feature of waste material and refuse. As a result, particularly efficacious optimization and control procedures such as MIMO (multiple input/multiple output) do not provide satisfactory results for the performance of the processes and for the optimization of costs, in view of uncertainties with regard to the characteristics of the material that is provided little by little to the reactor. The idea has therefore been conceived of shifting attention from the input parameters to the output parameters of the reactor. It has surprisingly been found that, in contrast with the prior art, if control and optimization models are centred on the output parameters of the reactor, suitably adapted, for example, by speeding up the response times of the analytical sensors to render them comparable with the times that are characteristic of the phenomena involved in the reaction, the number of effective predictions for the control and for the optimization of operation can be substantially improved whilst effluent quality and safety performance are fully complied with.

Basically, the plant and the method of the present invention have various advantageous characteristics which are innovative individually and taken as a whole, and conspicuous amongst which are: the provision of a reactor tending towards isothermy or quasi-isothermy at high temperature; the use of recirculation gases which are quantitatively minimized, minimizing temperature, but which, as such, under pressure enable a uniform high temperature to be reached in the reactor, in which a pressure greater than atmospheric pressure is, preferably but in non-limiting manner, maintained in use in order also to ensure the maximum hold-up of oxygen per unit volume, which can absorb uncontrolled fluctuations in combustion-supporter demand; immediate fusion in the reactor of the substances which cannot be gasified, saving them from dispersal as dust entrained in the combustion gases; and control of the output parameters of the reactor in order to control fluctuations due to the non-homogeneity of the materials supplied to the reactor.

Further characteristics and advantages will become clear from the following detailed description of a preferred embodiment which is given by way of non-limiting example with reference to appended FIG. 1 which shows an illustrative layout of the reactor and of the basic reaction circuit of a plant formed in accordance with the present invention.

With reference now to FIG. 1, a plant for the treatment of materials comprises an oxidation reactor or chamber 10 with at least one input opening 11 through which the material to be treated is supplied. In particular, the plant of the present invention can treat solid materials in coarse pieces, loaded by means of a feeder 12 by means of a propulsion chamber 13, as well as granular materials loaded by means of a feeder 14, and liquids comprising in general terms, both mixtures of water and suspended and sedimented solids and viscous pitches or sludges of various densities and compositions, which are loaded into the reactor by means of a feeder 15. Gaseous materials can also be loaded into the reactor 10 by means of a loader generally indicated 16.

The reactor 10 also comprises an input 17 to which oxygen coming from a duct 18 is supplied, mixed with a proportion of recirculated fumes coming from a duct 19 in accordance with procedures which will become clearer from the following portion of this description. A predetermined flow of steam may also be admitted to the duct 19 in a variable ratio according to the material treated. The flow-rate of oxygen is regulated automatically on the basis of the preset excess in the stream 25 output from the reactor 10, within predefined ranges, on the basis of the quantity and quality of material supplied to the reactor which, preferably but in non-limiting manner, is admitted to the reactor in small and frequent loads.

The reactor 10 comprises a shell, preferably made of metal and lined with a ceramic coating, and cooled externally by cooling water coming from a feeder 20. The incombustible slag which is produced inside the reactor collects on its base 21 which is inclined towards an output duct 22 which, preferably but in non-limiting manner, comprises a tube made of a material with a high melting point (e.g. molybdenum, tantalum, or tungsten, treated to resist oxidation, or silicon carbide), which is heated to keep the slag liquid, and is disposed in the vicinity of a closure end 23 of the reactor 10. The liquid slag is cooled rapidly ("quenched") in a water bath with the formation of solid beads so as to form a very dilute sludge in water which is then sent continuously from a collecting tank 24 for subsequent filtration and disposal by known means, for example, by means of a filter (not shown).

A output duct 25 is provided on the closure end 23 of the reactor 10 and supplies the gas that is generated inside the reactor 10 towards means for recovering energy by the exchange of heat of the gases output from the reactor by known systems, which means will be identified below for simplicity of description by the term "boiler" which should be understood in its broadest sense. Such a boiler 26, which is preferably but in non-limiting manner of the type with smoke tubes, generates and superheats steam from supply water coming from a duct 27. The superheated steam leaves the boiler 26 through a duct 35 and is sent for generally known uses, for example, for the supply of a turbine or the like.

Before entering the boiler 26, the gas output from the reactor 10 through the duct 25 is mixed with the moderator recycling gas supplied through a duct 28. The moderator recycling gas represents a portion of the gas output from the boiler 26 through a duct 29, optionally further cooled by a conventional system (not shown) and repressurized by means of a blower 30. The portion of moderator recycling gas which is not sent to the duct 28 to be mixed with the gases output from the reactor 10 is sent towards a duct 31 on which a regulation system 32 acts, admitting a regulated quantity of gas into the duct 19 in order to mix it, as described above, with the oxygen supplied to the input of the reactor 10 through the duct 18. The function of the stream which passes through the duct 31 is also to ensure the thermal balance of the reactor by means of an appreciable input/output heat difference to prevent the skin temperature of the coating exceeding the limits permitted for special refractory materials (about 2130°K). The regulator 32 is therefore modulated on the basis of the temperature sensor at the output from the reactor 10 in the stream passing through the duct 25.

The recirculation gases which ensure the thermal balance of plant operate continuously by removing excess reaction heat owing to the appreciable heat difference between the input and the output of the reactor and are recycled at the minimum temperature that is compatible with normal cooling means and preferably just above the dew point.

The portion of gas output from the boiler 26 which is not recycled towards the duct 29 is expanded by an expansion valve 33 and subsequently sent to a smoke line 34 of generally known type. A portion of this output gas is preferably withdrawn through a duct 36 and used to pressurize the propulsion chamber 13 for the periodic admission of the solid material into the reactor 10.

The various components of the above-described plant are preferably mounted on one or more slides for easy transportation and mounting of the plant in the place of use.

The method for the treatment of the materials which is implemented by the plant described above is controlled as a whole by an electronic processor which ensures that the combustion gases remain inside the reactor 10 for a predetermined minimum period of time, preferably but in non-limiting manner of about 2 seconds, at a predetermined minimum guaranteed uniform temperature, preferably but in non-limiting manner of about 1500° C.

In particular, the combustion supporter which is supplied into the reactor 10 and which comprises a proportionally predetermined mixture of oxygen (gas transparent to IR) and moderator recycling gas, is immediately irradiated because it is highly opaque to infra-red. This behaviour is ensured by the absence, or low concentration in the case of the use of enriched air, of nitrogen (a gas which is transparent to IR) in the combustion-supporter mixture and by the predominant presence, instead, of carbon dioxide and of water (markedly of the latter) of which the moderator recycling gas is constituted. At the high reactor-skin working temperatures, the water and the carbon dioxide which are admitted in the combustion-supporter mixture, together with the oxygen, preferably but in non-limiting manner when the process is running under pressure, themselves become optimal absorbers of infra-red energy. On the other hand, the recycled gas and the fumes that are generated behave as efficient emitters of infra-red energy which, also by virtue of the working pressures of the reactor 10 which are preferably but in non-limiting manner between 0.5 and 6 bar, thus enable a uniform temperature to be maintained inside the reactor 10.

The control system arranges for the implementation of a balancing regulation, which uses a determination that is not upset by the weight of the material supplied, by means of a measurement in the loading systems in a position upstream of the propulsion chambers. The control system intervenes instantaneously to keep the temperature and the time spent by the gases inside the reactor 10 above predetermined minimum thresholds and, in the second place, on the flow-rate of the oxygen and on the flow-rate of the refuse, that is, on the loading frequency thereof, to ensure a good quality of the gases output from the reactor 10. A MIMO (multiple input/multiple output) code, on the other hand, uses a broader range of operating data and, in particular, measurements of the composition of the gases at the output of the reactor, which are performed with characteristic response times of about, but in non-limiting manner, 2 seconds, and calculates strategies for optimizing operation for a satisfactory productivity of the material-treatment method and for the reduction of unitary and running costs.

Naturally, the principle of the invention remaining the same, the forms of embodiment and details of construction may vary from those described and illustrated, without thereby departing form the scope of the present invention.

The invention claimed is:

1. Method for the treatment of materials, in particular waste materials and refuse, comprising:
   supplying the material to be treated and a combustion supporter to an oxidation chamber or a combustion reactor, wherein the combustion supporter consists essentially of oxygen and recycled gases; and
   discharging gases produced during the oxidation or combustion of the material from the oxidation chamber or combustion reactor,
   wherein the material to be treated and the products resulting from the oxidation or combustion are subjected to conditions of isothermy or quasi-isothermy at high or very high temperature, without oxygen deficit, in any part of the chamber or reactor, such that cold zones are eliminated,
   wherein the oxidation chamber or combustion reactor is operated at a pressure from greater than atmospheric pressure to 600 kPa and includes a single combustion chamber,
   wherein water is injected into the recycled gases to raise the concentration of water in the recycled gases to higher than 30% by volume,
   wherein at the mouth of the reactor the produced combustion fumes show a TOC content less than 1 ppm and an ash content lower than 10 mg/Nm$^3$,
   wherein an incombustible slag produced inside the reactor is collected on a base of the reactor,
   wherein the reactor base is inclined towards an output duct,
   wherein the slag is maintained as a liquid by heating the output duct,
   wherein the slag is delivered to a collecting tank,
   wherein the oxidation chamber or combustion reactor is operated at a temperature of 1300K to 2130K, wherein the gases output from the reactor are mixed with a portion of the gas output from a boiler, and wherein the portion of the gas output from the boiler which is not mixed with the gases output from the reactor is mixed with the oxygen supplied at the input of the reactor and producing a combustion-supporting mixture which is opaque to infra-red.

2. Method for the treatment of materials according to claim 1, further comprising the supply of a combustion supporter comprising oxygen mixed with gases resulting from the combustion, with water, or with a combination of gases and water, to bring about opacification of the combustion supporter and to ensure almost instantaneous heating of the combustion supporter that is supplied into the reactor.

3. Method for the treatment of materials according to claim 2, wherein the recycled gases resulting from combustion are supplied at flow-rate and/or temperature so as to minimize the overall volume of gas in the reactor for a gas residence time in the reactor and to ensure the removal of a reaction heat from the reactor.

4. Method for the treatment of materials according to claim 2, wherein the mixing of the oxygen with the recycled combustion gases takes place with a concentration of more than 10% by volume and preferably more than 60% by volume.

5. Method for the treatment of materials according to claim 2, wherein the recycled gases which ensure the thermal balance of a plant that is operated continuously by removing the excess reaction heat owing to an appreciable enthalpy difference between the input and the output of the reactor are recycled at a minimum temperature that is compatible with normal cooling means.

6. Method for the treatment of materials according to claim 2, wherein the recycled gases which ensure the thermal balance are constituted wholly or partially by steam.

7. Method for the treatment of materials according to claim 1, wherein, in the reactor, the high rate of heating of the combustible material reduces to negligible value a fraction of dust that is entrained out of the reactor with the burnt gases.

8. Method for the treatment of materials according to claim 1, wherein the fused slag is cooled and solidified into beads so as to ensure that toxic heavy metals contained in the incombustible slag are rendered completely inert.

9. Method for the treatment of materials according to claim 1, further comprising a MIMO (multiple input/multiple output) control and optimization procedure which is focused on the parameters at the output of the reactor and in particular on measurement of gas composition at the output of the reactor.

10. Method for the treatment of materials according to claim 9, wherein the measurements of the gas composition are implemented with characteristic response times of about 2 seconds.

11. Method for the treatment of materials according to claim 5, wherein the minimum temperature is above the dew point of the recycled gases.

12. Method for the treatment of materials according to claim 1, wherein oxygen is substituted with technical oxygen.

13. Method for the treatment of materials according to claim 1, wherein the solid fuel is introduced into the combustor reactor by using recycled gas under pressure withdrawn from the output line of the reactor.

14. Method for the treatment of materials according to claim 1, wherein the oxidation chamber or combustion reactor is operated at a temperature of 1773K to 2130K.

15. Method for the treatment of materials according to claim 1, wherein the oxidation chamber or combustion reactor is operated at a temperature of 1900K to 2130K.

16. An apparatus for the treatment of materials operating in accordance with the method according to claim 1.

17. An apparatus for the treatment of materials, in particular waste materials and refuse, comprising:
an oxidation chamber or a combustion reactor to which the material to be treated can be supplied comprising:
an input for a combustion supporter consisting essentially of oxygen and recycled gases; and
an output for the gases produced during the oxidation or combustion of the above-mentioned material inside the chamber or reactor,
wherein the oxidation chamber or combustion reactor is isothermic or quasi-isothermic operated at a temperature of 1300 K to 2130 K, without oxygen deficit, in all of its parts, such that cold zones are eliminated,
wherein the oxidation chamber or combustion reactor is operated at a pressure from greater than atmospheric pressure to 600 kPa,
wherein water is injected into the recycled gases to raise the concentration of water in the recycled gases to higher than 30% by volume,
wherein at the mouth of the reactor the produced combustion fumes show a TOC content less than 1 ppm and an ash content lower than 10 $mq/Nm^3$, wherein the gases output from the reactor are mixed with a portion of the gas output from a boiler, and wherein the portion of the gas output from the boiler which is not mixed with the gases output from the reactor is mixed with the oxygen supplied at the input of the reactor and producing a combustion-supporting mixture which is opaque to infra-red.

18. An apparatus for the treatment of materials according to claim 17, wherein the walls of the reactor comprise a ceramic lining material which participates in the isothermy or quasi-isothermy of the reactor.

19. An apparatus for the treatment of materials according to claim 17, further comprising a plurality of feeders for supplying materials to the reactor, selected from solid materials in pieces, granular materials, liquid or sludgy materials, and/or gaseous materials.

20. An apparatus for the treatment of materials according to claim 19, further comprising at least one propulsion chamber for the pressurized and discontinuous supply of solid materials in pieces into the reactor, said propulsion chamber comprising a duct for the supply of gas under pressure, withdrawn from the output line.

21. An apparatus for the treatment of materials according to claim 17, wherein the reactor comprises a base portion communicating with and inclined towards a heated duct for collecting fluid slag.

22. An apparatus for the treatment of materials according to claim 21, wherein the collecting duct communicates with a container for collecting the fluid slag which is cooled rapidly in a water bath with the formation of solid beads so as to form a dilute water slurry.

23. An apparatus for the treatment of materials according to claim 21, wherein the collecting duct comprises heating means for keeping the slag fluid.

24. An apparatus for the treatment of materials according to claim 17, further comprising sensor means for measuring output parameters of the reactor, a control and management system receiving the signals of the sensor means in order substantially to improve the number of effective predictions for intervention in the operating conditions of the plant and to control fluctuations due to the non-homogeneity of the materials that are supplied into the reactor.

25. Method for the treatment of materials according to claim 17, wherein oxygen is substituted with technical oxygen.

26. Method for the treatment of materials, in particular waste materials and refuse, comprising:
supplying the material to be treated and a combustion supporter to an oxidation chamber or a combustion reactor, wherein the combustion supporter consists essentially of oxygen and water; and discharging gases produced during the oxidation or combustion of the material from the oxidation chamber or combustion reactor, wherein the material to be treated and the products resulting from the oxidation or combustion are subjected to conditions of isothermy or quasi-isothermy operated at a temperature of 1300 K to 2130 K, without oxygen deficit, in any part of the chamber or reactor, such that cold zones are eliminated, wherein the oxidation chamber or combustion reactor is operated at a pressure from greater than atmospheric pressure to 600 kPa and includes a single combustion chamber, wherein at the mouth of the reactor the produced combustion fumes show a TOC content less than 1 ppm and an ash content lower than 10 mg/Nm$^3$, wherein an incombustible slag produced inside the reactor is collected on a base of the reactor, wherein the reactor base is inclined towards an output duct, wherein the slag is maintained as a liquid by heating the output duct, wherein the slag is delivered to a collecting tank, wherein the oxidation chamber or combustion reactor is operated at a temperature of 1300K to 2130K, wherein the gases output from the reactor are mixed with a portion of the gas output from a boiler, and wherein the portion of the gas output from the boiler which is not mixed with the gases output from the reactor is mixed with the oxygen supplied at the input of the reactor and producing a combustion-supporting mixture which is opaque to infra-red.

* * * * *